April 8, 1941.  F. L. DUNLAP  2,237,594
FOLDABLE WINDSHIELD FOR MOTORCYCLES
Filed Jan. 15, 1940
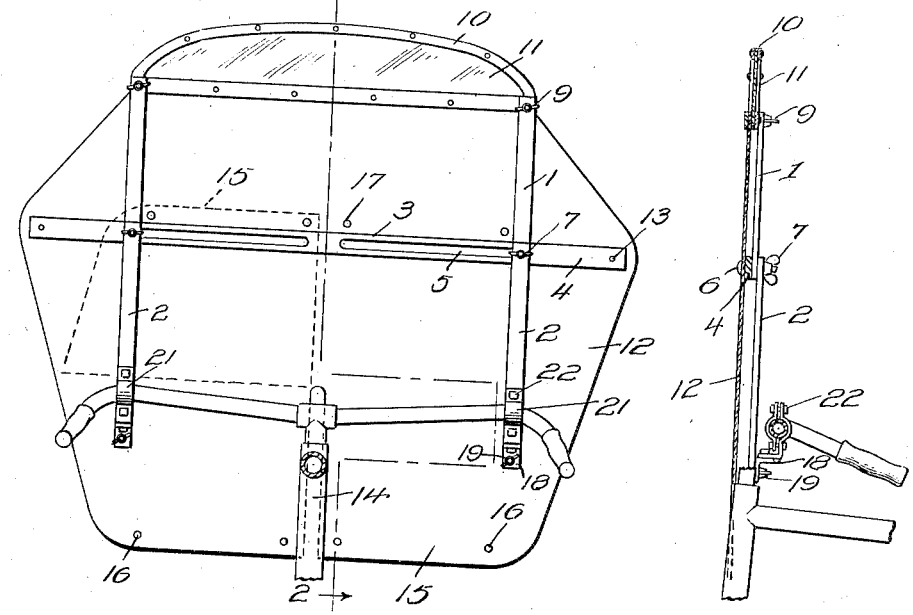
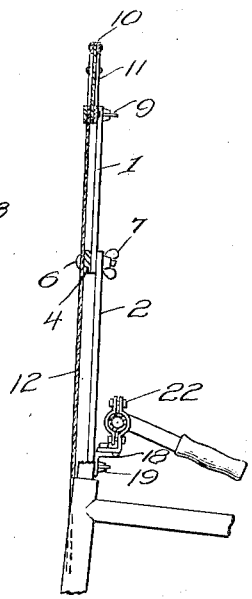
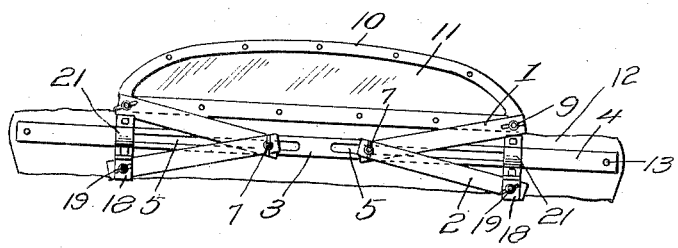
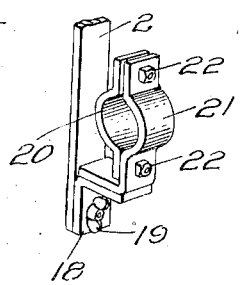
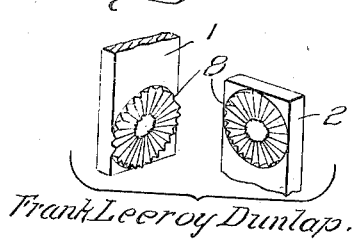
Frank Leeroy Dunlap,
INVENTOR
BY Victor J. Evans & Co.
ATTORNEYS Patented Apr. 8, 1941

2,237,594

UNITED STATES PATENT OFFICE 2,237,594

FOLDABLE WINDSHIELD FOR MOTORCYCLES

Frank Leeroy Dunlap, Canal Winchester, Ohio

Application January 15, 1940, Serial No. 314,003

1 Claim. (Cl. 296—78.1)

This invention relates to windshields, and its general object is to provide a windshield that is foldable, so that it can be set up in position for use in front of the operator, during inclement weather or folded in compact form to take up minimum space, during warm or pleasant weather.

A further object is to provide a foldable windshield that can be attached and removed with respect to a motorcycle or the like, as well as set up and folded while attached in an easy and expeditious manner, but regardless of the position thereof, it will be fixed against casual removal or displacement.

Another object is to provide a foldable windshield that will amply protect the operator, but will in no way interfere with the operation of the motorcycle or the operator's vision, and therefore adds materially to safe driving.

A still further object is to provide a foldable windshield that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a rear view illustrating a windshield in set up position and attached to the handle bars of a motorcycle or the like.

Figure 2 is a sectional view taken approximately on line 2—2 of Figure 1.

Figure 3 is a view similar to Figure 1, with the windshield in folded position.

Figure 4 is a detail perspective view illustrating one of the attaching brackets.

Figure 5 is a detail perspective view illustrating one of the serrated joints of the frame members.

Referring to the drawing in detail, it will be noted that my windshield includes a body frame that is made up of a pair of uprights, each of which includes an upper section 1 and a lower section 2 in the form of metallic strips and each section has an opening adjacent the ends thereof.

The body frame likewise includes an elongated strip 3 of a length to not only bridge the uprights, when the latter are in set up position as shown in Figure 1, but also to extend outwardly beyond the same to provide outer portions 4. The strip 3 is provided with a pair of slots 5 extending along its longitudinal center and from adjacent its transverse center. Mounted through the slots 5 as well as through the registering openings in the overlapped inner ends of the upper and lower sections 1 and 2, are headed bolts 6 that are provided with wing nuts 7, and the confronting faces of the companion sections 1 and 2, are serrated as at 8 to provide interfitting ridges and grooves arranged in disk formation and radiating from the bolt receiving openings, as clearly shown in Figure 5, so that when the nuts 7 are tight, casual breaking of the joint between the companion sections is practically impossible, thus preventing sliding movement of the bolts within the slots, as will be apparent upon inspection of Figure 1.

Secured to the upper ends of the upper sections 1 by threaded studs extending through the openings thereof, and wing nuts 9 is a fixed frame 10 having a straight lower portion and a rounded upper portion and mounted in the frame 10 and held accordingly by suitable fastening means in a sheet 11 of transparent material, such as Celluloid, isinglass or the like.

Secured to and depending from the straight lower portion of the frame 10 is a sheet 12 of fabric material, such as canvas, rubberized cloth or the like. The sheet 12 is of a width to extend slightly beyond the ends of the center horizontal strip 3 and is fixed to the extending portions 4 as at 13. It will be noted that the sheet 12 decreases in width toward its upper and lower ends, so that its widest portion is along the length of the strip 3, as clearly shown in Figure 1. The sheet 12 is of a height to extend a considerable distance below the lower ends of the uprights, and is slit from its lower end, along its vertical center for a portion of its height, as at 14 to provide flaps 15 to facilitate folding the shield, as will be apparent. The lower ends of the flaps have snap fastener members 16 secured thereto, to be received in companion members 17 for securing the flaps in raised position, prior to folding the shield, and one of the flaps is shown secured in its raised position in dotted lines in Figure 1.

The shield is fixed to the handle bars of the cycle in the form shown and a pair of attaching brackets is provided for that purpose. The attaching brackets include right angle base members 18 secured to the lower ends of the lower sections 2 by bolts provided with wing nuts 19 and the confronting faces of the base members 18 and sections 2 are preferably serrated in the same manner as the confronting faces of the sections 1 and 2, to eliminate any possibility of casual movement of the sections 2 with respect to the attaching brackets. Mounted on the horizontal portions of the base members 18 by bolt and nut connections are clamping members, each including companion collar portions 20 and 21, the portions 21 being fixed to the said horizontal portions, while the portions 20 are adjustable and secured to the portions 21 by bolt and nut connections 22, having the bolts thereof extending through apertured ears included in each of the collar portions, as best shown in Figure 4.

From the above description and disclosure in the drawing, it will be obvious that the shield can be readily folded from its set up position of Figure 1, to the position of Figure 2, and when it is desired to fold the shield, the flaps 15 are raised and secured to their dotted line position of Figure 1. The wing nuts 9, 7 and 19 are then loosened and the sections 1 and 2 are moved toward each other by sliding the bolts 6 in the slots 5 of the strip 3, thence the wing nuts are tightened to hold the shield in folded position.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A foldable windshield for a motorcycle or the like, comprising a body frame including a pair of uprights, each upright being made up of an upper and lower section having their inner ends pivotally connected together, a center strip bridging the uprights and being slotted longitudinally from adjacent the transverse center thereof to adjacent its ends and having the pivots of the sections mounted for slidable movement in the slots for disposal of the uprights to folded and set up positions, said strip being of a length to extend outwardly beyond the uprights when the latter are in set up position, means for securing the uprights in either of their positions, framed transparent means connected to the upper ends of the uprights, a fabric sheet secured to and depending from the frame of the transparent means and decreasing in width from its upper and lower ends, said sheet having its widest portion disposed along the length of the strip and secured to the extending ends thereof, and adjustable means connected to the lower ends of the uprights for securing the windshield to the cycle.

FRANK LEEROY DUNLAP.